(12) United States Patent
Wakayama et al.

(10) Patent No.: US 7,868,520 B2
(45) Date of Patent: Jan. 11, 2011

(54) DRIVING APPARATUS

(75) Inventors: Tomihiro Wakayama, Saitama (JP); Chiharu Katagiri, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 110 days.

(21) Appl. No.: 12/292,803

(22) Filed: Nov. 26, 2008

(65) Prior Publication Data
US 2009/0140607 A1 Jun. 4, 2009

(30) Foreign Application Priority Data
Nov. 29, 2007 (JP) ............................. 2007-308458

(51) Int. Cl.
*H01L 41/08* (2006.01)
(52) U.S. Cl. .................. 310/329; 310/323.02
(58) Field of Classification Search ............ 310/323.02, 310/323.03, 328
See application file for complete search history.

(56) References Cited

U.S. PATENT DOCUMENTS

| 5,589,723 | A | 12/1996 | Yoshida et al. |
| 6,111,336 | A | 8/2000 | Yoshida et al. |
| 6,528,926 | B2 * | 3/2003 | Okamoto et al. ....... 310/323.17 |
| 6,717,329 | B2 * | 4/2004 | Yoshida et al. ......... 310/316.02 |
| 6,765,334 | B1 * | 7/2004 | Iino et al. ............... 310/323.02 |
| 6,803,699 | B2 * | 10/2004 | Yuasa et al. .................. 310/317 |
| 7,157,834 | B2 * | 1/2007 | Miyazawa ................... 310/328 |
| 7,622,847 | B2 * | 11/2009 | Kawakatsu ................. 310/333 |

FOREIGN PATENT DOCUMENTS

JP  7-274544  10/1995

* cited by examiner

*Primary Examiner*—Mark Budd
(74) *Attorney, Agent, or Firm*—Wenderoth, Lind & Ponack, L.L.P.

(57) ABSTRACT

A driving apparatus includes a piezoelectric element which expands and contracts when a voltage is applied thereto, a driving shaft fixed to one end of the piezoelectric element in an expanding-and-contracting direction, a friction part frictionally engaged with the driving shaft, a lens holder moved along a direction of an optical axis of a lens, and a direction-changing unit which reciprocates the lens holder in the front-rear direction along the optical axis. The direction-changing unit includes a translation cam mechanism including a moving member and a moved member, and converts a linear movement along the expanding-and-contracting direction into a linear movement along the direction of the optical axis.

17 Claims, 11 Drawing Sheets

DRIVING APPARATUS

BACKGROUND OF THE INVENTION

1. Field of the Invention

The present invention relates to a driving apparatus including an electromechanical transducer as a driving source.

2. Description of the Related Art

Japanese Unexamined Patent Application Publication No. 7-274544 discloses an example of a technique in this field. A driving apparatus described in this publication includes a driving shaft (non-deforming part) and a lens barrel (driven part). The driving shaft is fixed to an end of a piezoelectric element in an expanding-and-contracting direction of the piezoelectric element. The lens barrel is frictionally engaged with the driving shaft by a pressure-contact spring (friction part) and a friction plate (friction part). When a pulse voltage is applied to the piezoelectric element, the piezoelectric element expands and contracts so as to move the driving shaft. As a result, the lens barrel, which is frictionally engaged with the driving shaft, is moved.

However, in the above-described driving apparatus, the expanding-and-contracting direction of the piezoelectric element is the same as the direction of an optical axis of a lens. Therefore, the piezoelectric element, the driving shaft, and a support plate for supporting the piezoelectric element and the driving shaft are arranged in the optical axis direction. Thus, the dimension of the apparatus in the optical axis direction is relatively large, and it is difficult to reduce the thickness of the driving apparatus.

SUMMARY OF THE INVENTION

An object of the present invention is to provide a driving apparatus with a reduced thickness.

According to an aspect of the present invention, a driving apparatus includes an electromechanical transducer which expands and contracts when a voltage is applied; a rod-shaped non-deforming part fixed to one end of the electromechanical transducer in an expanding-and-contracting direction; a friction part frictionally engaged with the non-deforming part, the friction part causing the non-deforming part to linearly move in the expanding-and-contracting direction when the electromechanical transducer expands and contracts; a direction-changing unit which converts a linear movement along the expanding-and-contracting direction into a linear movement in a direction perpendicular to the expanding-and-contracting direction; and a driven part which is moved in the direction perpendicular to the expanding-and-contracting direction by the direction-changing unit.

In the driving apparatus according to the aspect of the present invention, the direction-changing unit converts the linear movement along the expanding-and-contracting direction of the electromechanical transducer into the linear movement along the direction perpendicular to the expanding-and-contracting direction. Accordingly, the driven part is moved along the direction perpendicular to the expanding-and-contracting direction. Therefore, the direction in which the driven part is moved and the expanding-and-contracting direction of the electromechanical transducer are perpendicular to each other. Therefore, the lengths of the electromechanical transducer and the non-deforming part do not affect the dimension of the apparatus in the moving direction. As a result, the dimension of the apparatus in the direction in which the driven part is moved can be reduced and the thickness of the driving apparatus can be reduced accordingly.

In the driving apparatus according to the present invention, preferably, the direction-changing unit comprises a translation cam mechanism including a moving member fixed to the other end of the electromechanical transducer in the expanding-and-contracting direction and a moved member provided on an outer wall of the driven part.

In such a case, the driven part can be smoothly moved in the moving direction thereof, and the stability of the linear movement of the driven part can be ensured.

In the driving apparatus according to the present invention, preferably, the moving member has a cam surface inclined with respect to the expanding-and-contracting direction, and the moved member protrudes outward from the outer wall of the driven part and is in line contact with the cam surface.

In such a case, the driven part to which the moved member is fixed can be reciprocated in the moving direction thereof by causing the moved member to slide along the cam surface of the moving member. The moved member is in line contact with the cam surface of the moving member. Therefore, an adequate contact frictional force can be applied between the moved member and the cam surface of the moving member, and the moved member can smoothly slide along the cam surface.

In the driving apparatus according to the present invention, preferably, the moved member protrudes outward from the outer wall of the driven part and has a cam surface inclined with respect to the expanding-and-contracting direction, and the moving member is in line contact with the cam surface.

In such a case, the driven part to which the moved member is fixed can be reciprocated in the moving direction thereof by causing the moving member to slide along the cam surface of the moved member. The moving member is in line contact with the cam surface of the moved member. Therefore, an adequate contact frictional force can be applied between the moved member and the cam surface of the moving member, and the moving member can smoothly slide along the cam surface.

Preferably, the driving apparatus according to the present invention further includes a spring member which presses the moved member against the moving member.

In such a case, the moved member is pressed against the moving member by the spring member. Therefore, the stability of the sliding motion can be ensured and the resistance to vibration and impact of the apparatus can be increased.

According to the present invention, a driving apparatus with a reduced thickness can be provided.

DETAILED DESCRIPTION OF THE INVENTION

Preferred embodiments of the present invention will be described below with reference to the accompanying drawings.

First Embodiment

Figure 1:
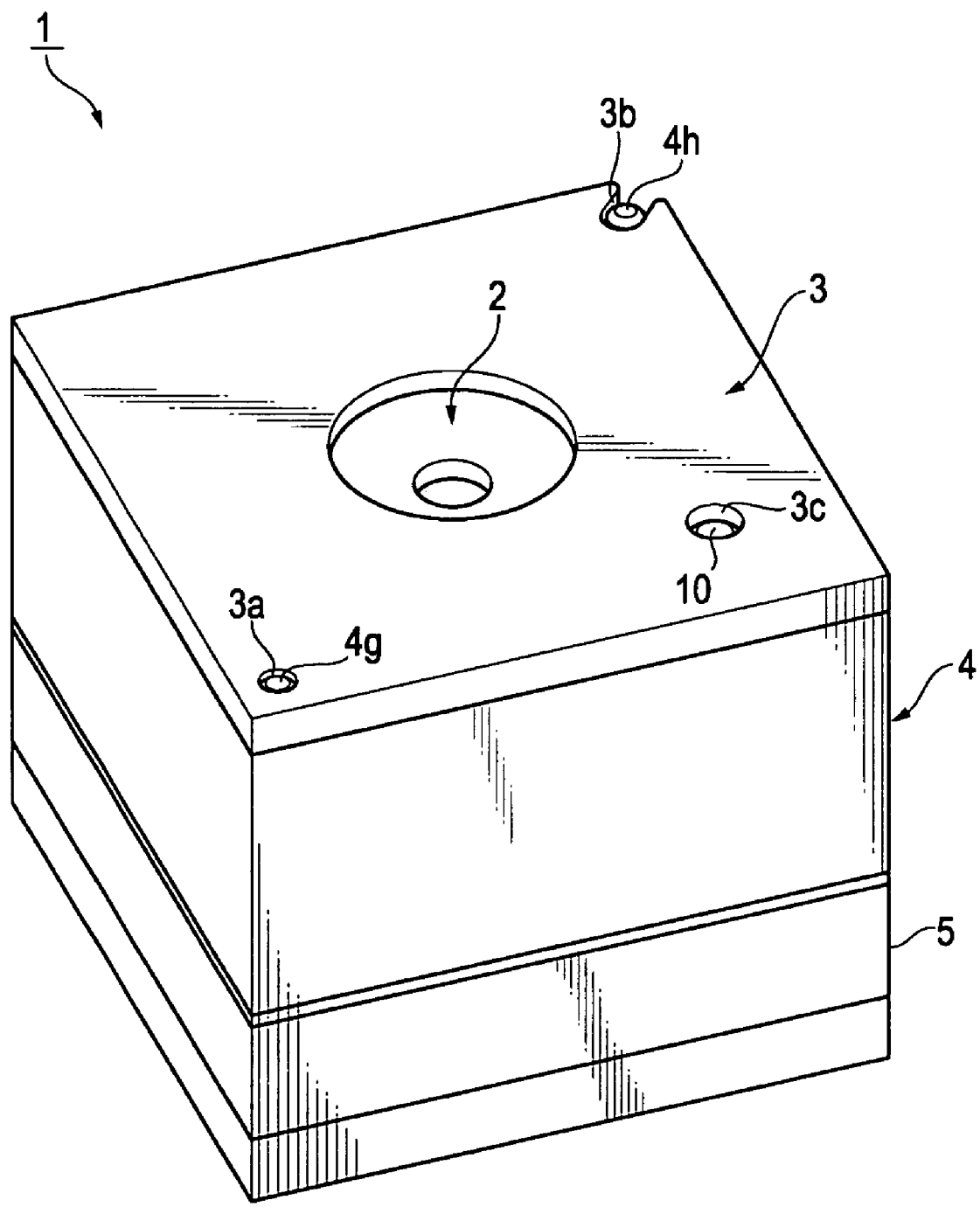
FIG. 1 is a perspective view of an optical apparatus having a driving apparatus according to a first embodiment the present invention.
Figure 2:
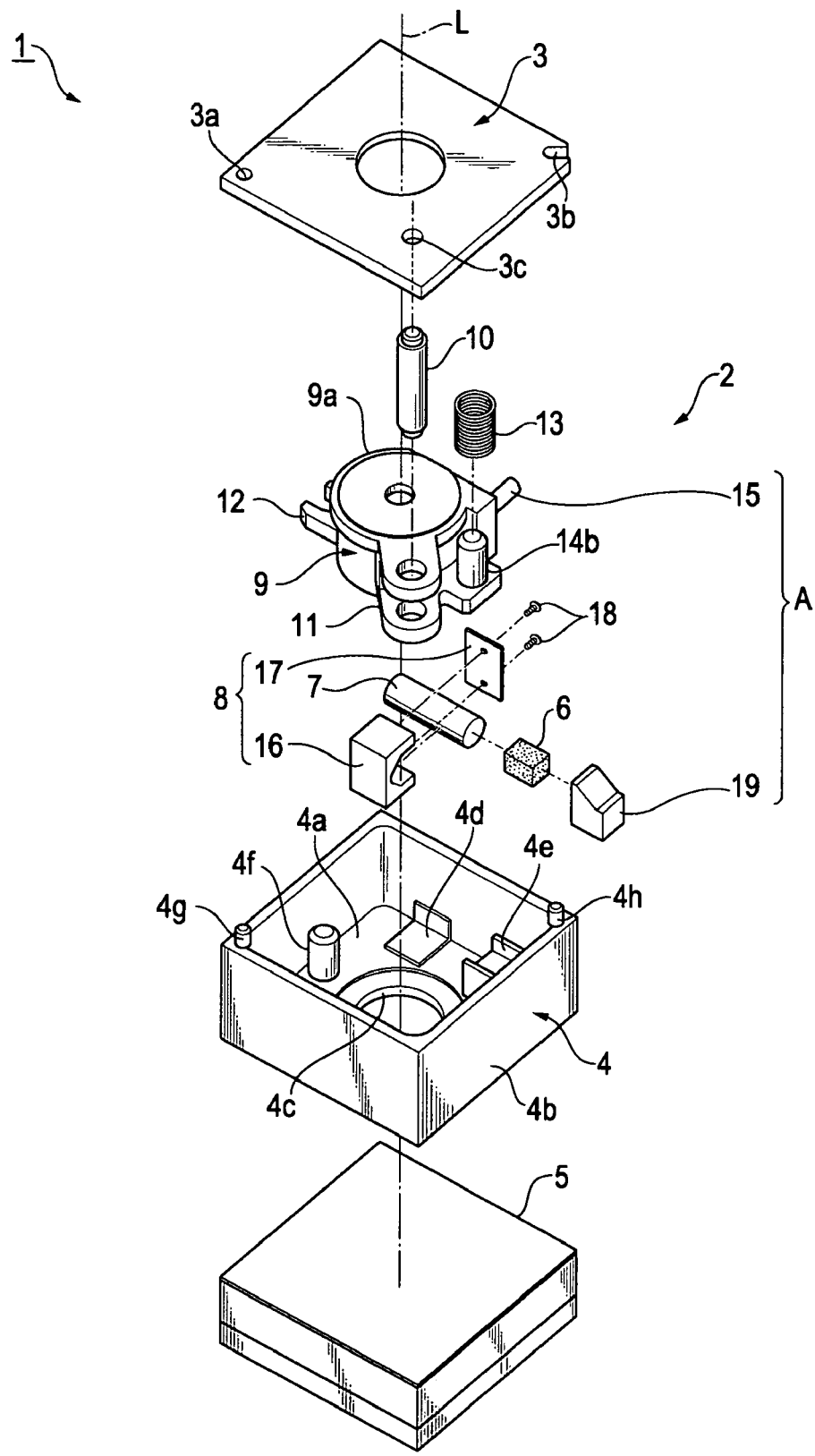
FIG. 2 is an exploded perspective view of the optical apparatus shown in FIG. 1.

Referring to FIGS. 1 and 2, an optical apparatus 1 is included in a digital camera or the like, and mainly includes a driving apparatus 2, a resin casing 4, and an image-pickup device (charge-coupled device (CCD) or complementary metal-oxide semiconductor (CMOS) device) 5. The driving apparatus 2 drives a lens (not shown) for forming an optical image of an object, and is housed in the casing 4 closed by a cover 3. The image-pickup device 5 converts the optical image of the object into digital image data.

The driving apparatus 2 includes a piezoelectric element (electromechanical transducer) 6 which expands and contracts when a voltage is applied thereto; a driving shaft (non-deforming part) 7 which is fixed to one end of the piezoelectric element 6 in an expanding-and-contracting direction thereof; a friction part 8 which is frictionally engaged with the driving shaft 7; and a lens holder (driven part) 9 which holds the lens. The lens holder 9 is reciprocated by a direction-changing unit A in a front-rear direction along an optical axis L of the lens. The direction of the optical axis L is perpendicular to the expanding-and-contracting direction. The direction-changing unit A is formed of a translation cam mechanism including a moving member 19 and a moved member 15, and converts a linear movement along the expanding-and-contracting direction into a linear movement along the direction of the optical axis L (that is, the direction in which the lens holder 9 is moved).

Figure 3:
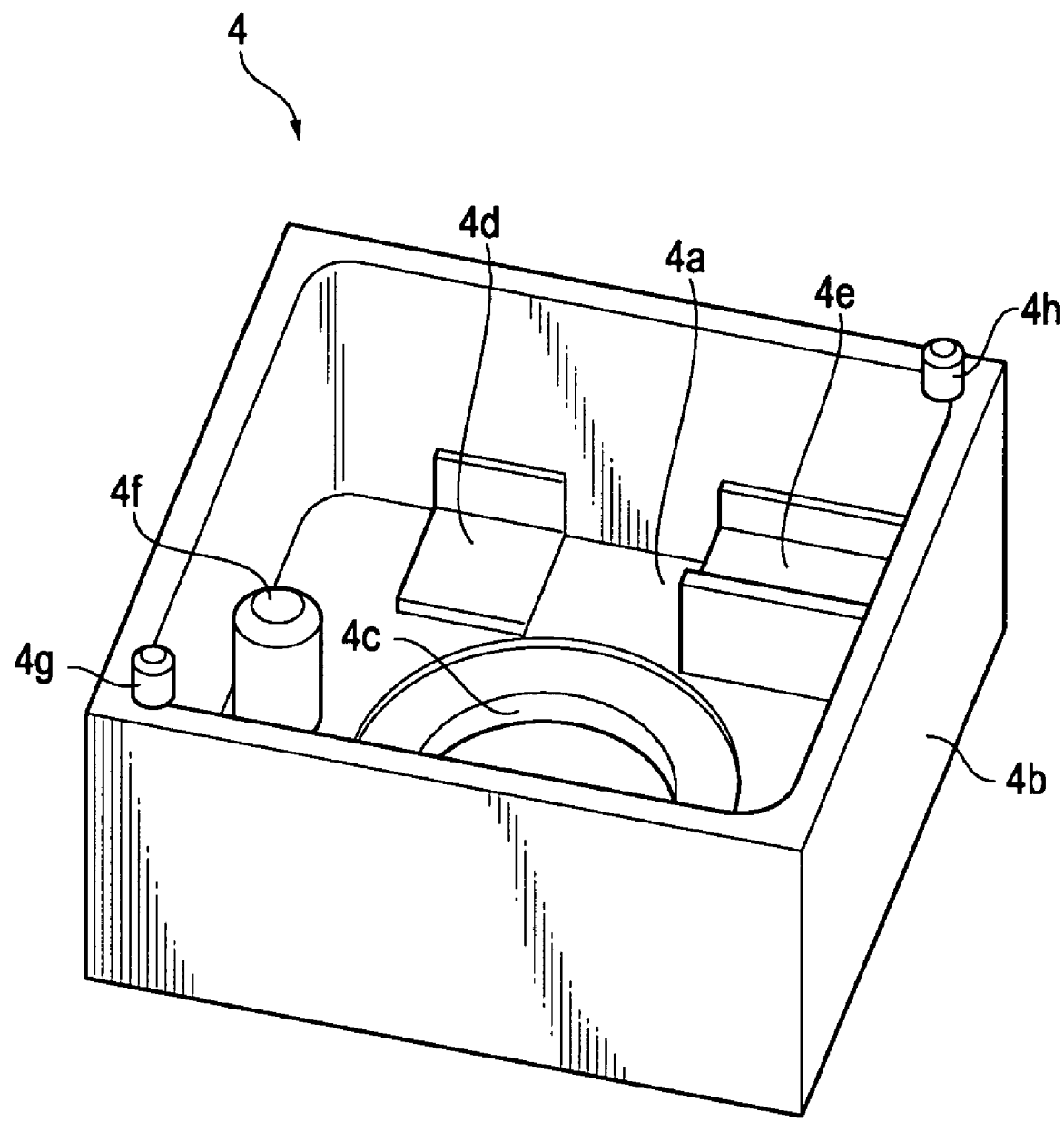
FIG. 3 is a perspective view of a casing.

As shown in FIG. 3, the casing 4 is box-shaped and is open at the top. The casing 4 includes a rectangular plate-shaped bottom portion 4a and a side-wall portion 4b formed integrally with the bottom portion 4a such that the side-wall portion 4b stands upright along the periphery of the bottom portion 4a. A circular light-transmitting window 4c which is centered on the optical axis L is formed in the bottom portion 4a at a central area thereof. A friction-part fixing portion 4d to which the friction part 8 is fixed and a guiding portion 4e for guiding the moving member 19 are disposed on the inner surface of the bottom portion 4a.

In addition, a columnar detent pin 4f which projects from the bottom portion 4a in the direction of the optical axis L is disposed inside the side-wall portion 4b. In addition, positioning pins 4g and 4h are formed on the top surface of the side-wall portion 4b. The positioning pins 4g and 4h are respectively inserted into a pin hole 3a and a U-shaped groove 3b (see FIG. 2) formed in the cover 3. Accordingly, the casing 4 and the cover 3 can be positioned with respect to each other when the cover 3 is placed on the casing 4.

Figure 4:
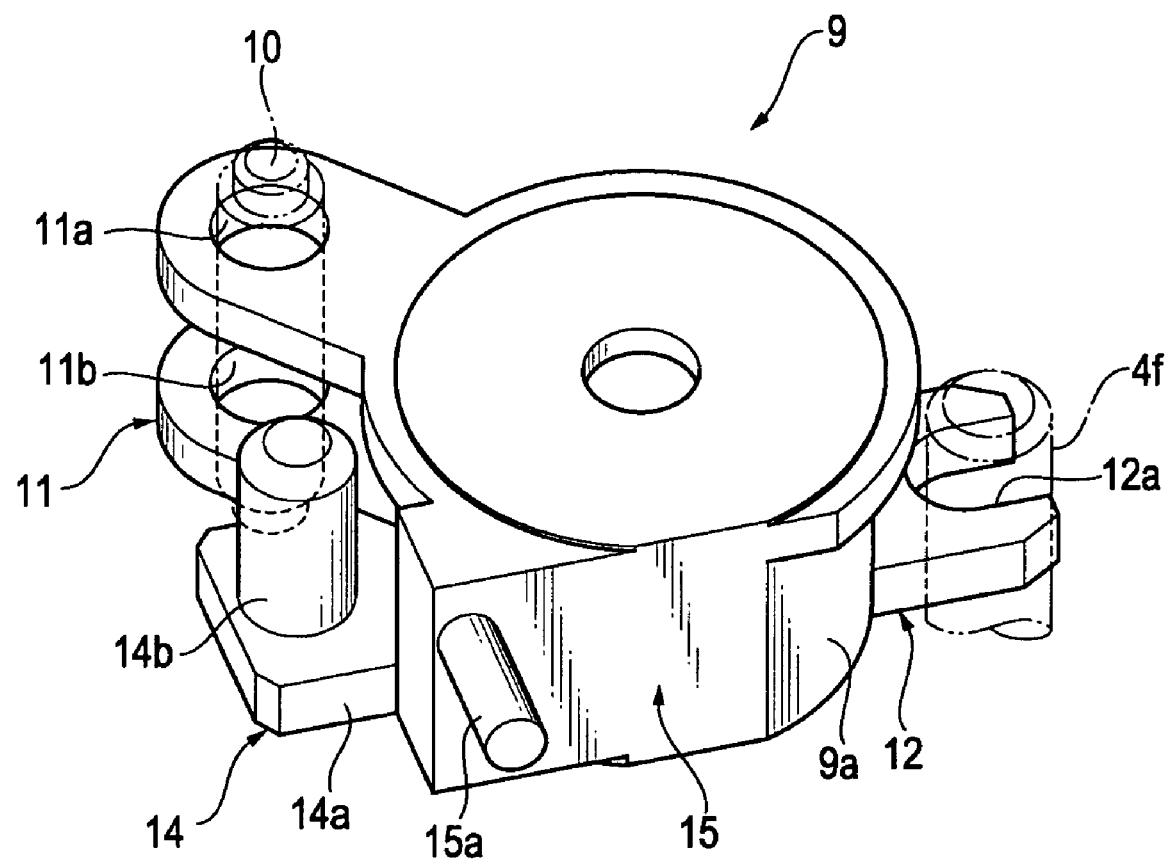
FIG. 4 is a perspective view of a lens holder.

As shown in FIG. 4, the lens holder 9 includes a cylindrical portion 9a for holding the lens. A slider portion 11 which engages with a guide shaft 10 is disposed on the outer peripheral wall of the cylindrical portion 9a. The slider portion 11 projects from the outer peripheral wall of the cylindrical portion 9a in the radial direction thereof, and has through holes 11a and 11b for receiving the guide shaft 10. The guide shaft 10 is inserted into the through holes 11a and 11b in the slider portion 11, so that the lens holder 9 can be guided by the guide shaft 10. The guide shaft 10 is disposed so as to stand between the cover 3 and the casing 4 such that the guide shaft 10 extends in the direction of the optical axis L. One end of the guide shaft 10 is inserted into an insertion hole (not shown) formed in the bottom portion 4a of the casing 4, and the other end of the guide shaft 10 is inserted into an insertion hole 3c (see FIG. 2) formed in the cover 3.

An engaging portion 12 is provided on the cylindrical portion 9a at a predetermined phase angle relative to the slider portion 11. The engaging portion 12 engages with the detent pin 4f provided in the casing 4. The engaging portion 12 projects from the outer peripheral wall of the cylindrical portion 9a in the radial direction thereof, and has a U-shaped groove portion 12a which receives the detent pin 4f. The detent pin 4f is inserted into the groove portion 12a, so that the rotation of the lens holder 9 is restricted. Thus, the lens holder 9 can be smoothly moved along the direction of the optical axis L.

In addition, a pedestal 14 which supports a coil spring (spring member) 13 is provided on the outer peripheral wall of the cylindrical portion 9a at a position opposite to the position where the engaging portion 12 is provided. The pedestal 14 includes a plate-shaped base 14a which projects from the outer peripheral wall of the cylindrical portion 9a in the radial direction thereof and a columnar pin 14b which stands upright on the base 14a at a central position thereof so as to extend in the direction of the optical axis L.

The coil spring 13 has an inner diameter larger than the diameter of the pin 14b and smaller than the width of the base 14a. Therefore, when the coil spring 13 is set to the pedestal 14, the coil spring 13 comes into contact with the base 14a and the pin 14b extends through the coil spring 13. The coil spring 13 is placed between the base 14a and the cover 3, and thereby presses a boss 15a of the moved member 15 against a cam surface 19a of the moving member 19.

The moved member 15 included in the direction-changing unit A is disposed on the outer peripheral wall of the cylindrical portion 9a at a position between the engaging portion 12 and the pedestal 14. The moved member 15 protrudes from the outer peripheral wall of the cylindrical portion 9a in the radial direction thereof, and the boss 15a, which has a columnar shape, is formed at an end of the moved member 15.

Figure 5:
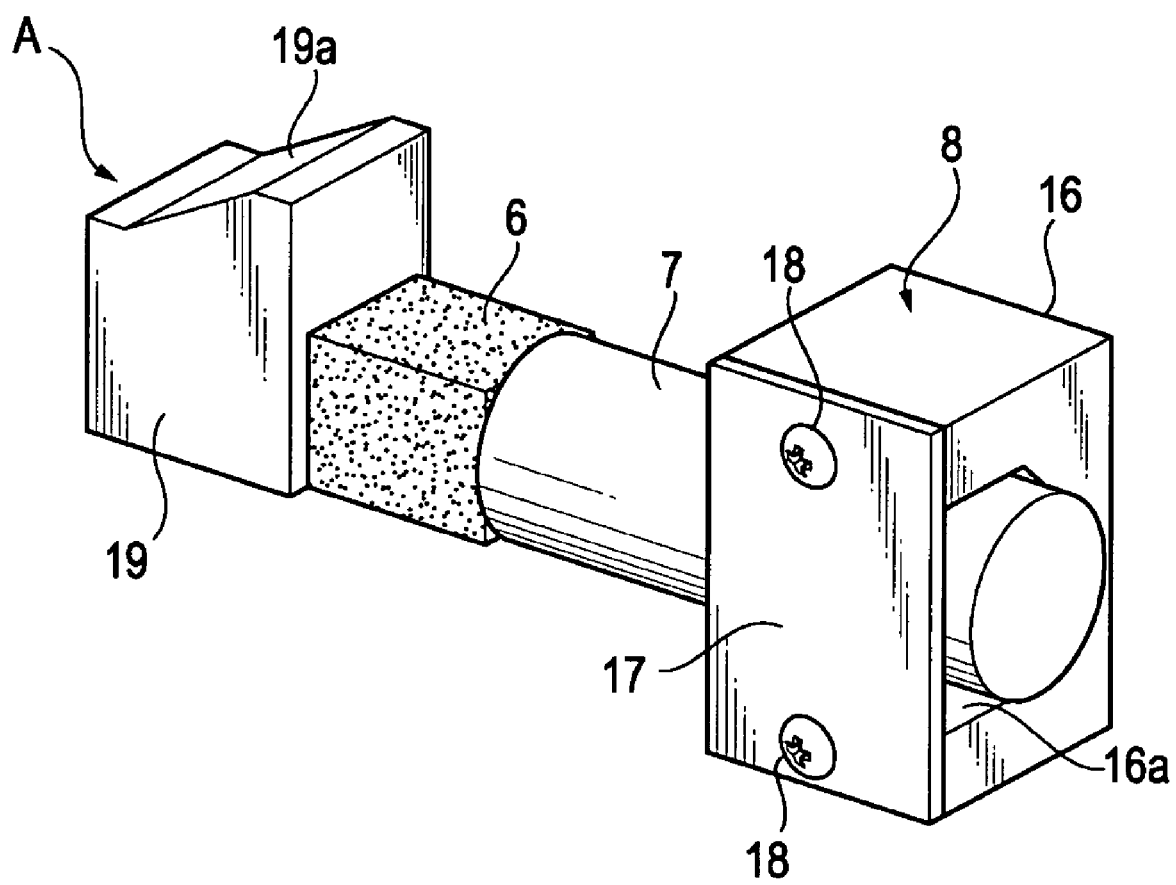
FIG. 5 is a perspective view of the driving apparatus according to a first embodiment in the state in which the lens holder is removed.
Figure 6:
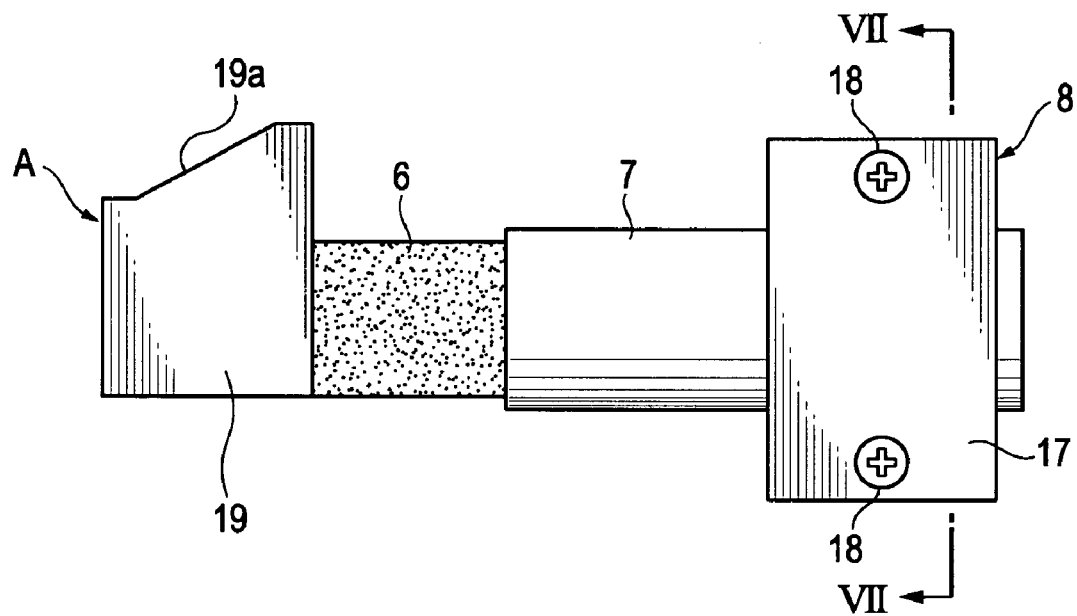
FIG. 6 is a front view of the driving apparatus shown in FIG. 5.
Figure 7:
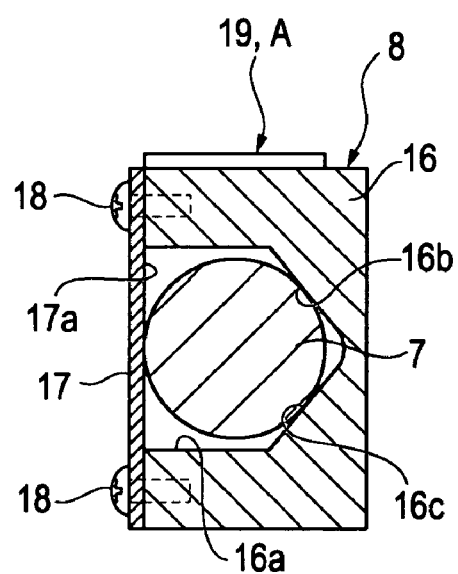
FIG. 7 is a sectional view of FIG. 6 taken along line VII-VII.

A piezoelectric actuator, which is capable of performing extremely fine positioning, can be used as the piezoelectric element 6. As shown in FIGS. 5 to 7, one end of the piezoelectric element 6 in the expanding-and-contracting direction thereof is fixed to the driving shaft 7 with an adhesive, and the other end of the piezoelectric element 6 is fixed to the moving member 19 included in the direction-changing unit A with an adhesive. The driving shaft 7 is formed of a carbon-based sintered body in a columnar shape, and extends in the expanding-and-contracting direction.

The friction part 8 includes a receiving portion 16 and a leaf spring 17 which are arranged so as to clamp the driving shaft 7 which extends in the expanding-and-contracting direction. The friction part 8 is frictionally engaged with the driving shaft 7 and serves to move the driving shaft 7 linearly in the expanding-and-contracting direction when the piezoelectric element 6 expands and contacts. The receiving portion 16 has a groove 16a for receiving the driving shaft 7. A bottom section of the groove 16a is shaped such that the width of the groove 16a decreases toward the bottom, and has V-shaped inner wall surfaces 16b and 16c. The leaf spring 17 is disposed in contact with the receiving portion 16 so as to enclose the driving shaft 7 in the groove 16a, and is attached to the receiving portion 16 with screws 18.

The driving shaft 7 is clamped by the inner wall surfaces 16b and 16c of the receiving portion 16 and an inner surface 17a of the leaf spring 17. The outer peripheral surface of the driving shaft 7 is in line contact with the inner wall surfaces 16b and 16c and the inner surface 17a (see FIG. 7). The moving member 19 is block-shaped, and a top surface of the moving member 19 is inclined with respect to the expanding-and-contracting direction to serve as the planar cam surface 19a. The boss 15a of the moved member 15 is caused to slide along the cam surface 19a, and accordingly the linear movement along the expanding-and-contracting direction of the piezoelectric element 6 is converted into the linear movement along the direction of the optical axis L.

Figure 9:
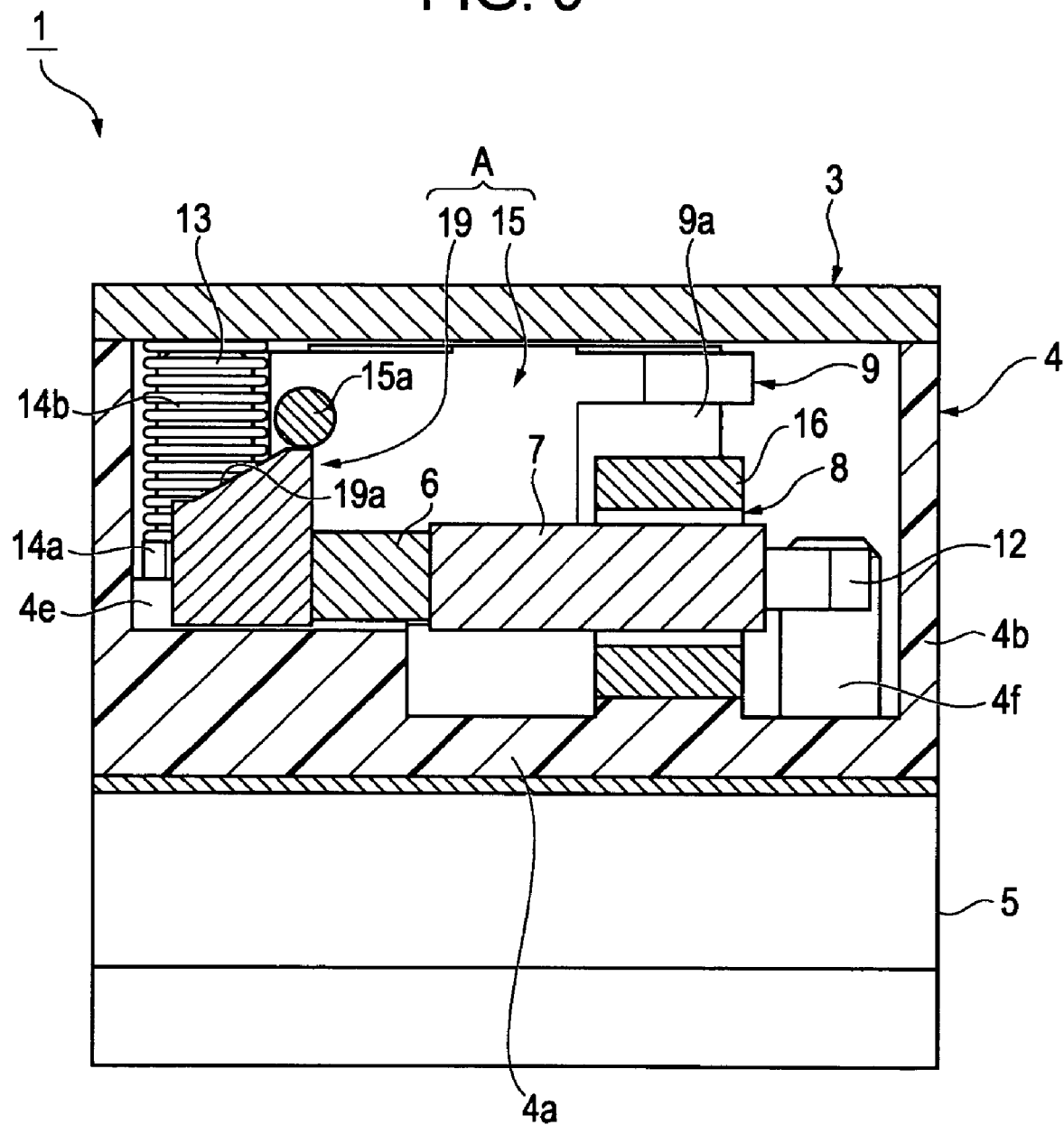
FIG. 9 is a sectional view of the optical apparatus.
Figure 10:
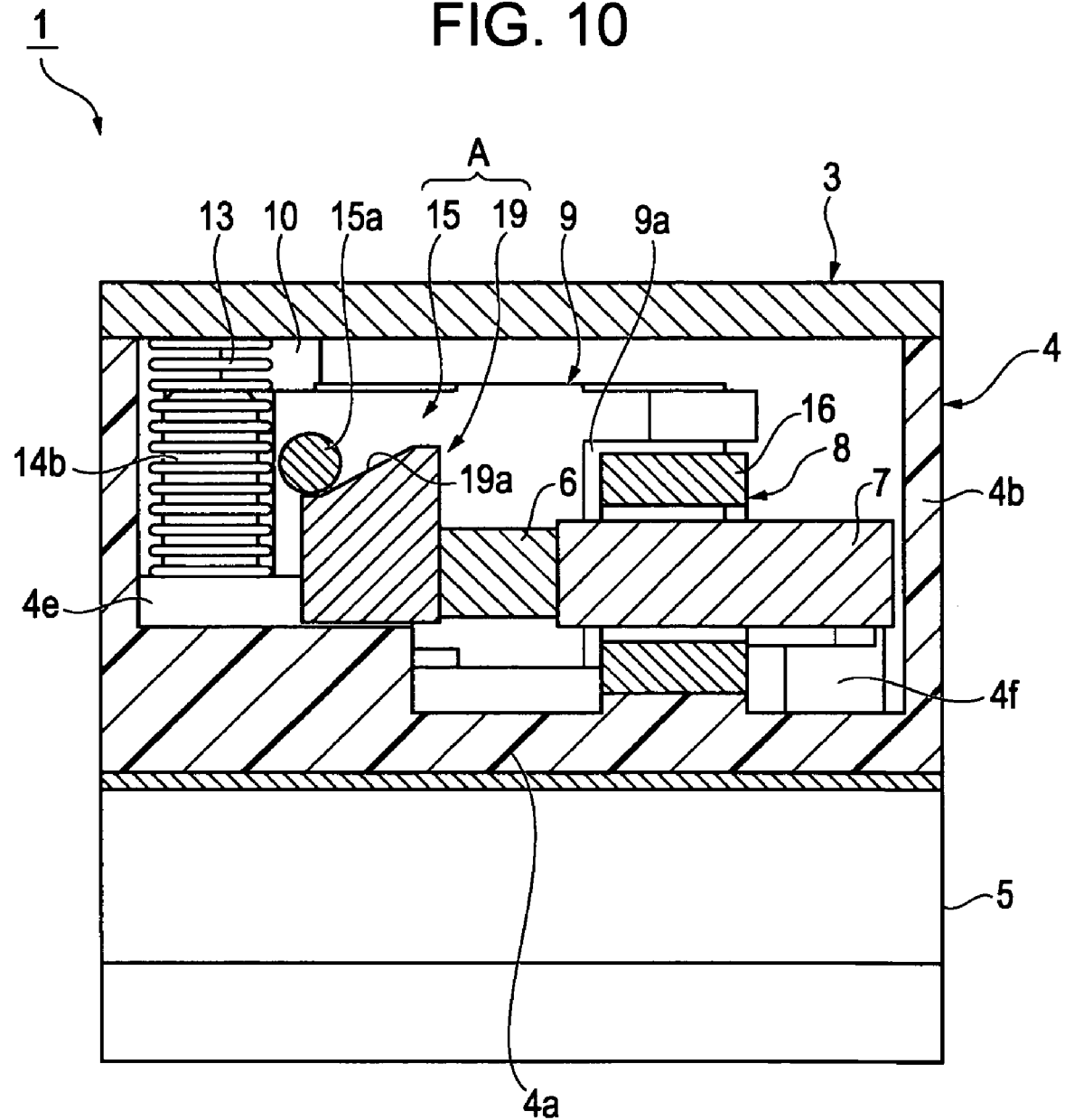
FIG. 10 is another sectional view of the optical apparatus.

The operation of the driving apparatus 2 will now be described with reference to FIGS. 8 to 10. When a pulse voltage with a low voltage-increase rate and a high voltage-reduction rate is applied to the piezoelectric element 6, the piezoelectric element 6 slowly expands and then quickly contracts. The driving shaft 7 is frictionally engaged with the friction part 8, and the friction part 8 is fixed to the friction-part fixing portion 4d formed integrally with the casing 4. Therefore, when the pulse voltage is applied to the piezoelectric element 6, the moving member 19 fixed to one end of the piezoelectric element 6 moves slowly toward the boss 15a along the expanding-and-contracting direction (direction shown by the arrow F1 in FIG. 8) while the voltage is being increased at a low rate, and does not move due to the inertial force while the voltage is being reduced at a high rate.

Figure 8:
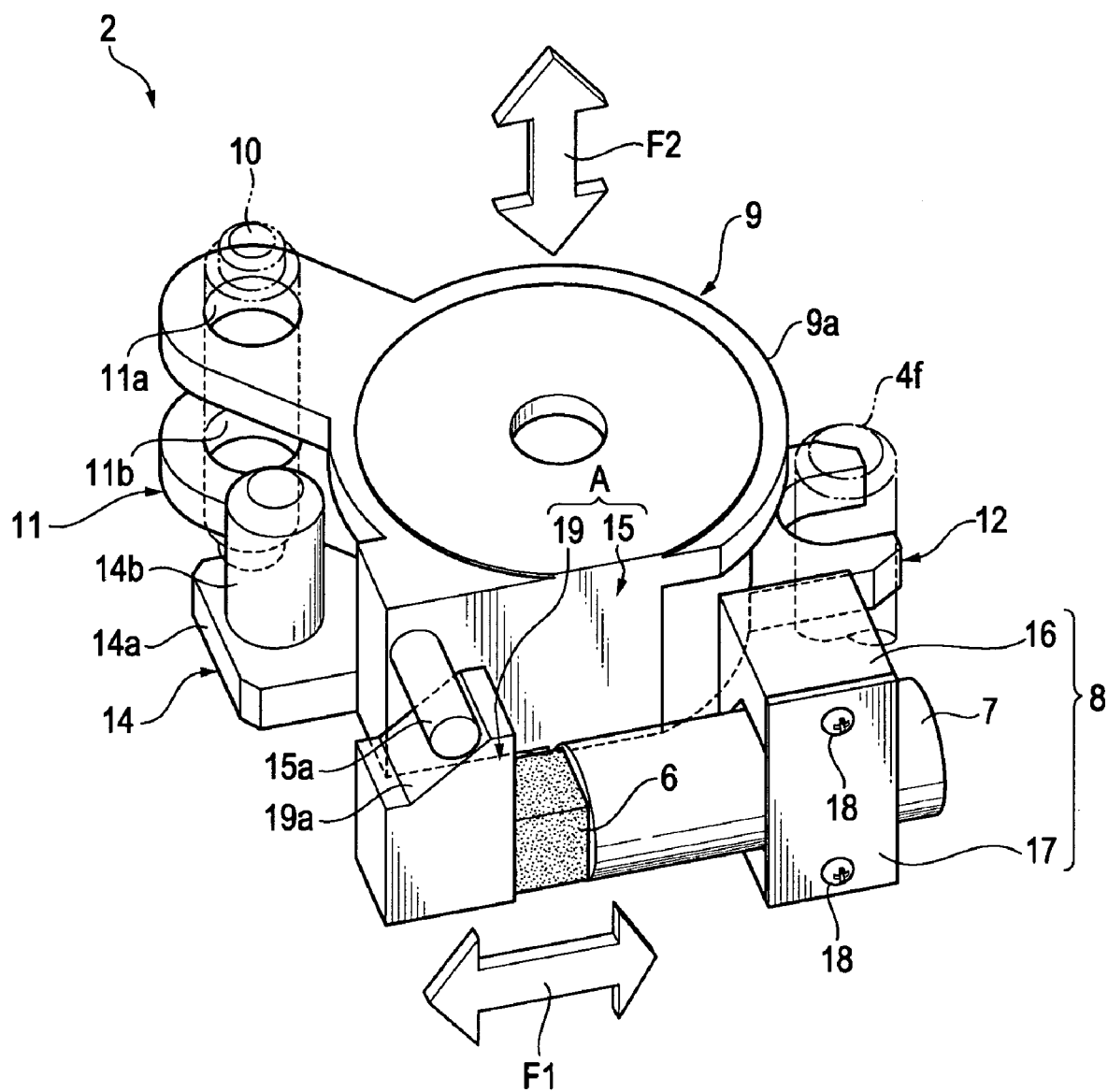
FIG. 8 is a perspective view of the driving apparatus according to the first embodiment.

If the pulse voltage with a low voltage-increase rate and a high voltage-reduction rate is repeatedly applied, the moving member 19 linearly moves toward the boss 15a along the expanding-and-contracting direction (direction shown by the arrow F1 in FIG. 8). At this time, the direction-changing unit A including the moving member 19 and the moved member 15 converts the linear movement along the expanding-and-contracting direction into a linear movement along the direction of the optical axis L (direction shown by the arrow F2 in FIG. 8). As a result, the lens holder 9 linearly moves along the direction of the optical axis L. More specifically, the boss 15a of the moved member 15 slides upward along the cam surface 19a of the moving member 19. Accordingly, the lens holder 9 to which the moved member 15 is fixed moves forward along the direction of the optical axis L against the pressing force applied by the coil spring 13.

Conversely, when a pulse voltage with a high voltage-increase rate and a low voltage-reduction rate is applied to the piezoelectric element 6, the piezoelectric element 6 quickly expands and then slowly contracts. The driving shaft 7 is frictionally engaged with the friction part 8, and the friction part 8 is fixed to the friction-part fixing portion 4d formed integrally with the casing 4. Therefore, when the pulse voltage is applied to the piezoelectric element 6, the moving member 19 fixed to one end of the piezoelectric element 6 does not move due to the inertial force while the voltage is being increased at a high rate, and moves away from the boss 15a along the expanding-and-contracting direction (direction shown by the arrow F1 in FIG. 8) while the voltage is being reduced at a low rate.

If the pulse voltage with a high voltage-increase rate and a low voltage-reduction rate is repeatedly applied, the moving member 19 linearly moves away from the boss 15a along the expanding-and-contracting direction (direction shown by the arrow F1 in FIG. 8). At this time, the direction-changing unit A including the moving member 19 and the moved member 15 converts the linear movement along the expanding-and-contracting direction into a linear movement along the direction of the optical axis L (direction shown by the arrow F2 in FIG. 8). As a result, the lens holder 9 linearly moves along the direction of the optical axis L. More specifically, the boss 15a of the moved member 15 slides downward along the cam surface 19a of the moving member 19. Accordingly, the lens holder 9 to which the moved member 15 is fixed moves rearward along the direction of the optical axis L.

In the driving apparatus 2 having the above-described structure, the boss 15a of the moved member 15 slides along the cam surface 19a of the moving member 19 so that the linear movement along the expanding-and-contracting direction is converted into the linear movement along the direction of the optical axis L and the lens holder 9 is moved along the direction of the optical axis L. Thus, the direction of the optical axis L in which the lens holder 9 is moved and the expanding-and-contracting direction of the piezoelectric element 6 are perpendicular to each other. Therefore, the lengths of the piezoelectric element 6 and the driving shaft 7 do not affect the dimension of the apparatus in the direction of the optical axis L. As a result, the dimension of the apparatus in the direction of the optical axis L can be reduced and the thickness of the driving apparatus 2 can be reduced accordingly. In addition, since the direction of the optical axis L and the expanding-and-contracting direction of the piezoelectric element 6 are perpendicular to each other, the influence of vibration, impact, etc., in the expanding-and-contracting direction on the lens holder 9 can be reduced. Thus, the resistance to vibration and impact of the lens holder 9 can be increased.

In addition, the direction-changing unit A including the moved member 15 and the moving member 19 is a translation cam mechanism. The boss 15a of the moved member 15 has a columnar shape, and the boss 15a and the cam surface 19a are in line contact with each other. Therefore, an adequate contact frictional force can be applied between the boss 15a and the cam surface 19a, and the boss 15a of the moved member 15 can smoothly slide along the cam surface 19a of the moving member 19. As a result, the lens holder 9 can smoothly reciprocate along the direction of the optical axis L, and the stability of the linear movement of the lens holder 9 can be ensured. In addition, since the boss 15a is pressed against the cam surface 19a by the coil spring 13, the boss 15a can stably slide along the cam surface 19a and the resistance to vibration and impact of the driving apparatus 2 can be increased.

Second Embodiment

Figure 11:
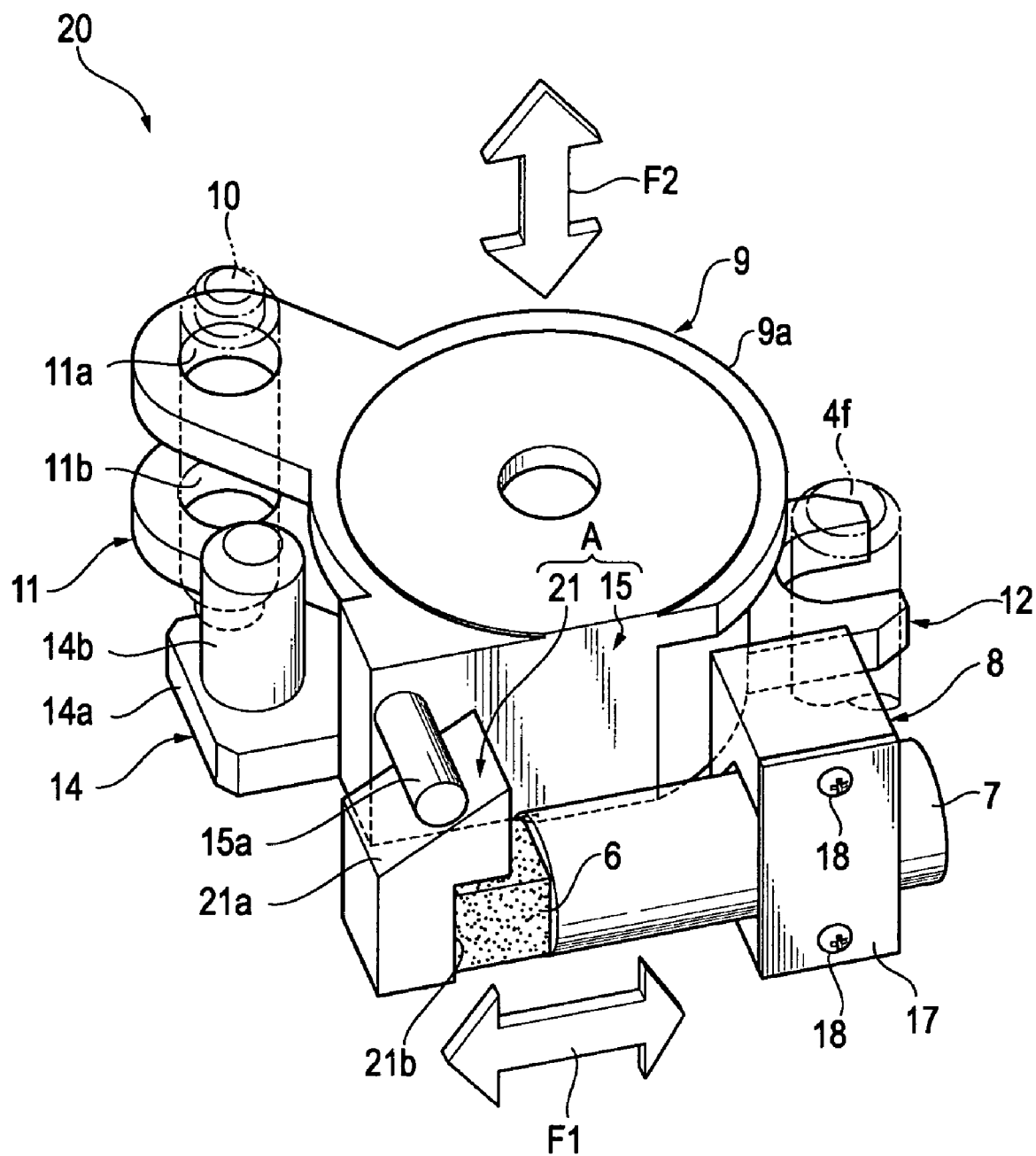
FIG. 11 is a perspective view of a driving apparatus according to a second embodiment.

Referring to FIG. 11, a driving apparatus 20 according to a second embodiment differs from the driving apparatus 2 according to the first embodiment in that a cam surface 21a of a moving member 21 extends to a position above the piezoelectric element 6. In other words, a portion of the moving member 21 above a portion 21b that is fixed to the piezoelectric element 6 protrudes over the piezoelectric element 6, and the cam surface 21a, which is a top surface of the moving member 21, extends to a position above the piezoelectric element 6 obliquely relative to the expanding-and-contracting direction. Other structures of the driving apparatus 20 are similar to those of the driving apparatus 2. Therefore, components similar to those of the driving apparatus 2 are denoted by the same reference numerals and explanations thereof are thus omitted.

The driving apparatus 20 provides effects similar to those of the driving apparatus 2 according to the first embodiment. In addition, since the cam surface 21a extends to a position above the piezoelectric element 6, the dimension of the moving member 21 in the expanding-and-contracting direction can be reduced without reducing the length of the can surface 21a.

Third Embodiment

Figure 12:
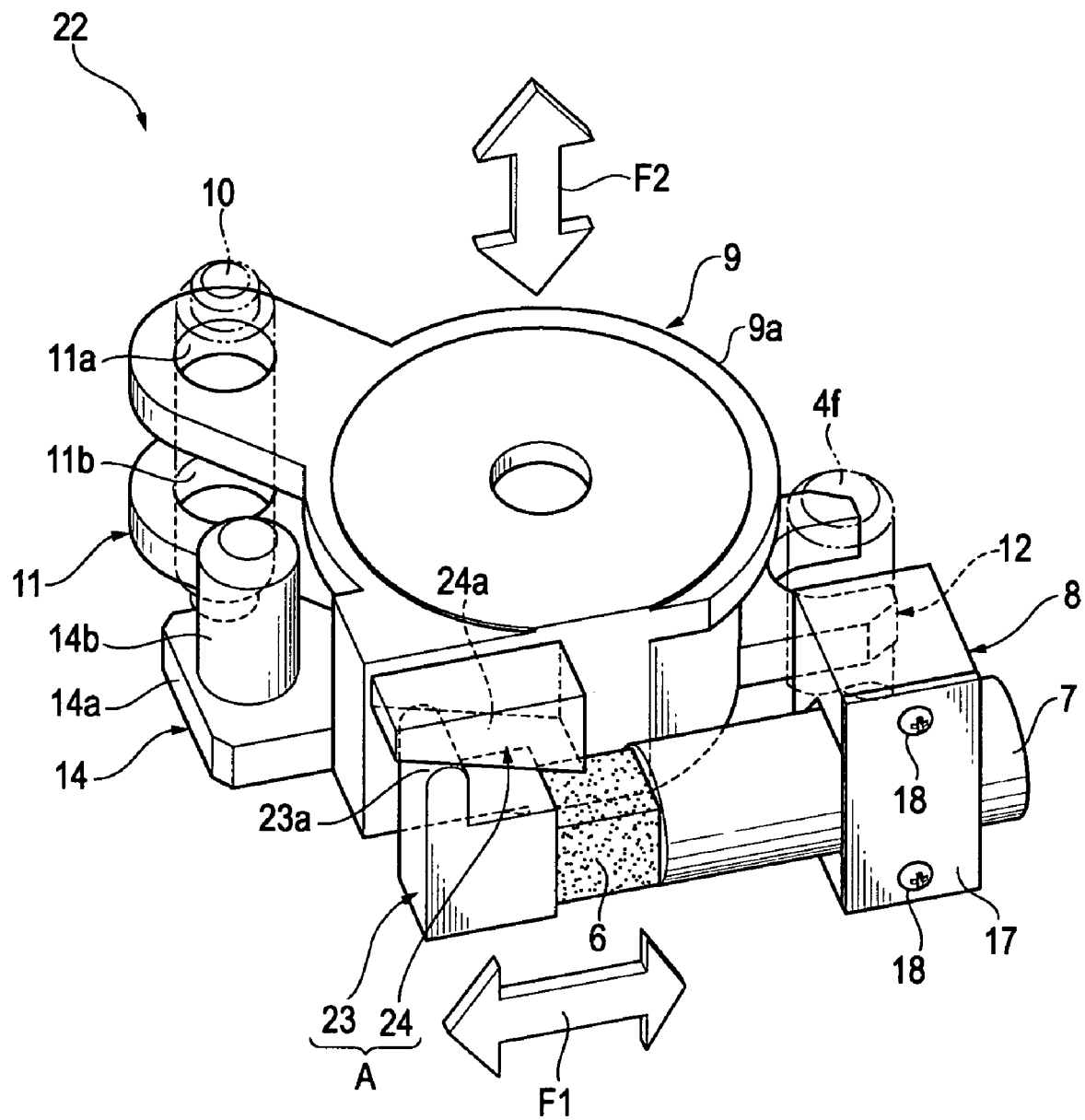
FIG. 12 is a perspective view of a driving apparatus according to a third embodiment.

Referring to FIG. 12, a driving apparatus 22 according to a third embodiment differs from the driving apparatus 2 of the first embodiment in that a cam surface 24a is formed on a moved member 24. More specifically, the moved member 24 is provided on the outer peripheral wall of the cylindrical portion 9a of the lens holder 9 at a position between the engaging portion 12 and the pedestal 14. The moved member 24 protrudes from the outer peripheral wall of the cylindrical portion 9a, and the cam surface 24a, which is inclined with respect to the expanding-and-contracting direction, is formed at an end of the moved member 24. A smooth, convex surface 23a which comes into line contact with the cam surface 24a is formed at the top end edge of a moving member 23. Other structures of the driving apparatus 22 are similar to those of the driving apparatus 2. Therefore, components similar to those of the driving apparatus 2 are denoted by the same reference numerals and explanations thereof are thus omitted. Due to the above-described structure, the driving apparatus 22 provides effects similar to those of the driving apparatus 2 according to the first embodiment.

The present invention is not limited to the above-described embodiments. For example, the shape of the direction-changing unit A is not limited to the above-described shape, and various modifications are possible as long as the direction-changing unit A is a translation cam mechanism.

What is claimed is:

1. A lens driving apparatus, comprising:
   a piezoelectric element which expands and contracts when a voltage is applied thereto;
   a rod-shaped driving shaft fixed to one end of the piezoelectric element in an expanding-and-contracting direction;
   a friction part frictionally engaged with the driving shaft, the friction part allowing the driving shaft to linearly move in the expanding-and-contracting direction when the piezoelectric element expands and contracts;
   a direction-changing unit which converts a linear movement along the expanding-and-contracting direction into a linear movement in a direction perpendicular to the expanding-and-contracting direction; and
   a lens holder which holds a lens, the lens holder being moved in the direction perpendicular to the expanding-and-contracting direction by the direction-changing unit.

2. The lens driving apparatus according to claim 1, wherein the direction-changing unit comprises a translation cam mechanism including a moving member fixed to the other end of the piezoelectric element in the expanding-and-contracting direction and a moved member provided on an outer wall of the lens holder.

3. The lens driving apparatus according to claim 2, wherein the moving member has a cam surface inclined with respect to the expanding-and-contracting direction, and the moved member protrudes outward from the outer wall of the lens holder and is in line contact with the cam surface.

4. The lens driving apparatus according to claim 2, wherein the moved member protrudes outward from the outer wall of the lens holder and has a cam surface inclined with respect to the expanding-and-contracting direction, and the moving member is in line contact with the cam surface.

5. The lens driving apparatus according to claim 2, further comprising a spring member which presses the moved member against the moving member.

6. The lens driving apparatus according to claim 3, further comprising a spring member which presses the moved member against the moving member.

7. The lens driving apparatus according to claim 4, further comprising a spring member which presses the moved member against the moving member.

8. A lens driving apparatus, comprising:
   a casing;
   a lens holder which holds a lens;
   a piezoelectric element which expands and contracts relative to the casing when a voltage is applied to the piezoelectric element;
   a driving shaft fixed to one end of the piezoelectric element in an expanding-and-contracting direction;
   a friction part connected to the casing and frictionally engaged with the driving shaft, the friction part allowing the driving shaft to linearly move in the expanding-and-contracting direction relative to the casing when the piezoelectric element expands and contracts; and
   a direction-changing unit which converts a linear movement of the piezoelectric element in the expanding-and-contracting direction into a linear movement of the lens holder in a direction perpendicular to the expanding-and-contracting direction,
   wherein the linear movement of the driving shaft allows the piezoelectric element expand and contract without moving the lens holder.

9. The lens driving apparatus according to claim 8, wherein a voltage-increase rate and a voltage-decrease rate of the voltage applied to the piezoelectric element determines whether the piezoelectric element moves the lens holder or the driving shaft.

10. The lens driving apparatus according to claim 8, further comprising a spring member which biases the lens holder in the direction perpendicular to the expanding and contracting direction.

11. The lens driving apparatus according to claim 8, wherein the direction-changing unit comprises a translation cam mechanism including a moving member fixed to the other end of the piezoelectric element in the expanding-and-contracting direction and a moved member provided on an outer wall of the lens holder.

12. The lens driving apparatus according to claim 11, wherein the moving member has a cam surface inclined with respect to the expanding-and-contracting direction, and the moved member protrudes outward from the outer wall of the lens holder and is in line contact with the cam surface.

13. The lens driving apparatus according to claim 11, wherein the moved member protrudes outward from the outer wall of the lens holder and has a cam surface inclined with respect to the expanding-and-contracting direction, and the moving member is in line contact with the cam surface.

14. The lens driving apparatus according to claim 11, further comprising a spring member which presses the moved member against the moving member.

15. The lens driving apparatus according to claim 12, further comprising a spring member which presses the moved member against the moving member.

16. The lens driving apparatus according to claim 13, further comprising a spring member which presses the moved member against the moving member.

17. The lens driving apparatus according to claim 8, wherein the lens holder is arranged such that an optical axis of the lens is perpendicular to the expanding-and-contracting direction.

* * * * *